(12) United States Patent
Sicilia

(10) Patent No.: US 7,270,538 B2
(45) Date of Patent: Sep. 18, 2007

(54) MIXING DEVICE

(75) Inventor: Robert Sicilia, Etobicoke (CA)

(73) Assignee: Mold-Masters Limited, Georgetown, Ontario (CA)

( * ) Notice: Subject to any disclaimer, the term of this patent is extended or adjusted under 35 U.S.C. 154(b) by 748 days.

(21) Appl. No.: 10/674,807

(22) Filed: Oct. 1, 2003

(65) Prior Publication Data

US 2004/0130062 A1    Jul. 8, 2004

Related U.S. Application Data

(60) Provisional application No. 60/415,140, filed on Oct. 2, 2002.

(51) Int. Cl.
*B29C 45/22* (2006.01)

(52) U.S. Cl. ...................... 425/566; 425/572

(58) Field of Classification Search ............... 425/572, 425/566
See application file for complete search history.

(56) References Cited

U.S. PATENT DOCUMENTS

| | | | |
|---|---|---|---|
| 3,696,840 A | 10/1972 | Odhner | |
| 4,123,496 A | 10/1978 | Gallizia et al. | |
| 4,299,553 A | 11/1981 | Swaroop | |
| 4,303,382 A | 12/1981 | Gellert | |
| 4,403,933 A | 9/1983 | Davis et al. | |
| 4,469,649 A | 9/1984 | Ibar | |
| 4,781,879 A | 11/1988 | Oishi | |
| 4,848,920 A | 7/1989 | Heathe et al. | |
| 4,965,028 A | 10/1990 | Maus et al. | |
| 5,069,840 A | 12/1991 | Arnott | |
| 5,192,556 A | 3/1993 | Schmidt | |
| 5,262,119 A | 11/1993 | Smith | |
| 5,421,715 A | 6/1995 | Hofstetter et al. | |
| 5,554,395 A | 9/1996 | Hume et al. | |
| 5,683,731 A * | 11/1997 | Deardurff et al. ........... 425/572 |
| 5,688,462 A | 11/1997 | Salamon et al. | |
| 5,783,234 A | 7/1998 | Teng | |
| 5,916,605 A | 6/1999 | Swenson et al. | |
| 5,941,637 A | 8/1999 | Maurer | |
| 5,955,121 A | 9/1999 | Gellert et al. | |
| 6,077,470 A | 6/2000 | Beaumont | |

(Continued)

FOREIGN PATENT DOCUMENTS

CA    1 165 525    4/1984

(Continued)

OTHER PUBLICATIONS

"Efficient Spiral Flow 3-D Microchannel", *published at* <http://www.shoji.comm.waseda.ac.jp/~mf/mfeg/Spiralflow.htm>, Shoji Laboratory, Waseda University, Japan, date unknown.

(Continued)

*Primary Examiner*—Tim Heitbrink
(74) *Attorney, Agent, or Firm*—Medler Ferro PLLC

(57) ABSTRACT

A mixing device for use with a manifold in an injection molding apparatus. The mixing device has a body which has a melt channel therethrough. The melt channel has a plurality of increasing sections which have an increasing cross-sectional area in a downstream direction, and a number of decreasing sections which have a decreasing cross-sectional area in a downstream direction. The increasing and decreasing sections alternate with each other.

19 Claims, 12 Drawing Sheets

U.S. PATENT DOCUMENTS

| | | | |
|---|---|---|---|
| 6,089,468 | A | 7/2000 | Bouti |
| 6,235,230 | B1 | 5/2001 | Puniello |
| 6,245,278 | B1 | 6/2001 | Lausenhammer et al. |
| 6,349,886 | B1 | 2/2002 | Bouti |
| 6,382,528 | B1 | 5/2002 | Bouti |
| 6,503,438 | B2 | 1/2003 | Beaumont et al. |
| 6,544,028 | B2 | 4/2003 | Wright et al. |
| 6,572,361 | B2 | 6/2003 | Gould et al. |
| 2002/0070288 | A1 | 6/2002 | Bouti |
| 2002/0086086 | A1 | 7/2002 | Doyle et al. |
| 2002/0149135 | A1 | 10/2002 | Choi et al. |
| 2004/0047943 | A1 | 3/2004 | White et al. |
| 2004/0164459 | A1 | 8/2004 | Babin et al. |
| 2004/0256768 | A1 | 12/2004 | Olaru |
| 2004/0265422 | A1 | 12/2004 | Sabin et al. |
| 2006/0051448 | A1* | 3/2006 | Schryver et al. ............ 425/381 |
| 2007/0077328 | A1* | 4/2007 | Olaru et al. ................ 425/572 |

FOREIGN PATENT DOCUMENTS

| | | |
|---|---|---|
| DE | 2017710 A1 | 10/1970 |
| DE | 3201710 A1 | 8/1982 |
| EP | 0 293 756 A2 | 7/1988 |
| EP | 0 779 140 A1 | 6/1997 |
| EP | 0 963 829 A1 | 12/1999 |
| EP | 1 140 456 B1 | 10/2001 |
| WO | WO 01/34365 A1 | 5/2001 |
| WO | WO-03/008173 A1 | 1/2003 |
| WO | WO-03/011443 A2 | 2/2003 |
| WO | WO-03/035358 A1 | 5/2003 |

OTHER PUBLICATIONS

"Hot Runner Nozzle Increase Performance", *Abstract*, <www.tool-moldmaking.com>, *European Tool & Mould Making, Husky Injection Molding Systems S.A.*, (Oct. 2001).

"Husky Introduces Ultraflow for Ultra Hot Runner Nozzles", *News Release, Husky Injection Molding Systems Ltd.*, (Jun. 23, 2003).

"Melt Mixing Technology Improves Part Quality", *News Release, Husky Injection Molding Systems Ltd.*, (Aug. 9, 2001).

"New UltraFlow Tip Improves Melt Homogeneity and Part Quality", *News Release, Husky Injection Molding Systems Ltd.*, (Oct. 20, 2004).

"Nozzle Tip Handles Quick Colour Changes", *Abstract*, <www.tool-moldmaking.com>, *European Tool & Mould Making Husky Injection Molding Systems S.A.*, (May/Jun. 2001).

"Stable Melt Profile Means Uniform Part Quality", *Abstract*, <www.tool-moldmaking.com>, *European Tool & Mould Making, Husky Injection Molding Systems S.A.*, (Jul./Aug. 2002).

"When Mixing It Is a Good Idea", *Abstract*, <www.tool-moldmaking.com>, *European Tool & Mould Making, Husky Injection Molding Systems S.A.*, Nov./Dec. 2001.

Beaumont, John P., et al., "Solving Mold Filling Imbalances in Multi-cavity Injection Molds", *Journal of Injection Molding Technology*, (Jun. 1998, vol. 2, No. 2), pp. 47-58.

Strook, Abraham D., "Microsystems, Microfluidic Transport, and Colloid Science", *Cornel University Website* at http://web1temp.cheme.cornell.edu/peopleevents/faculty/stroock/research.htm, date unknown.

Wright, Corin, "Improving Color Change in Hot Runner Molds", *Plastics Machinery & Auxiliaries*, (Apr. 2003).

Blundy, John, "Improving Shear Induced Imbalance In Hot Runner Systems," Opti-flo™, Hot Runner Manifold Systems with MeltFlipper® Technology, INCOE® Corporation, Jun. 25, 2004, pp. 1-14.

\* cited by examiner

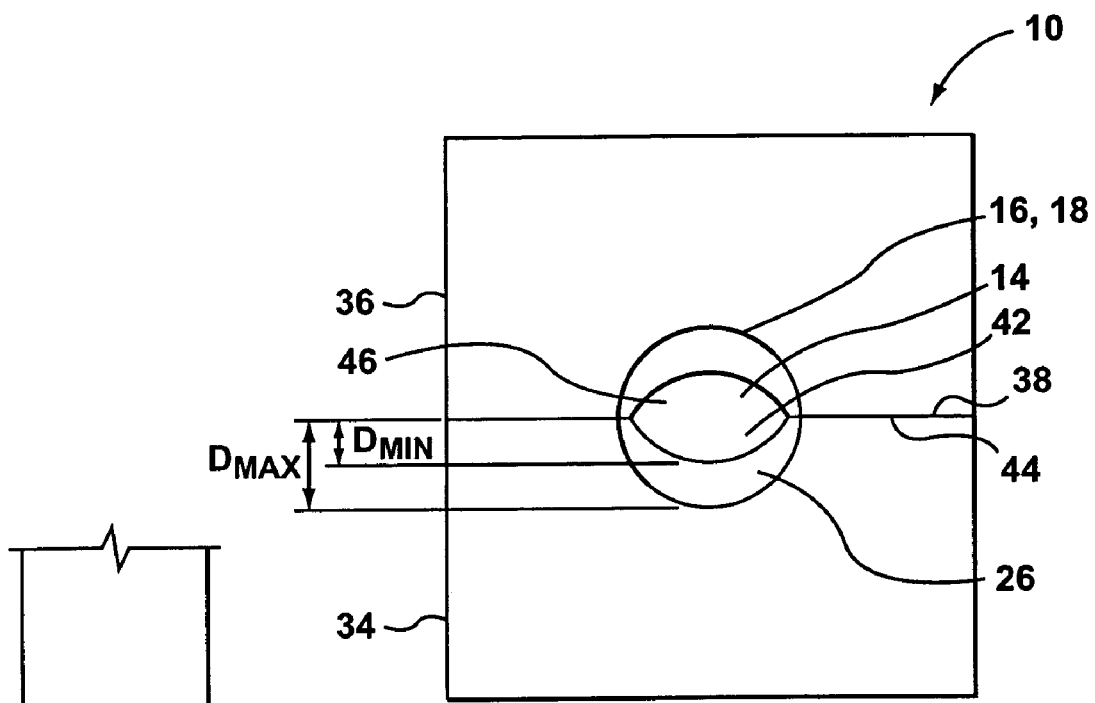
FIG. 4b
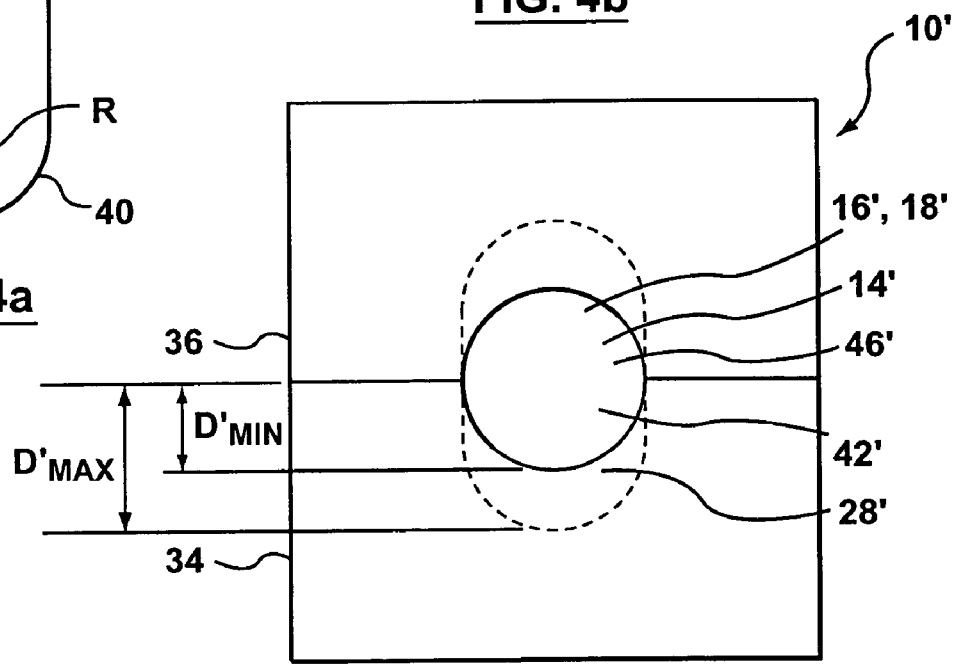
FIG. 4a
FIG. 4c

MIXING DEVICE

CROSS-REFERENCE TO RELATED APPLICATION

This application claims the priority of provisional application Ser. No. 60/415,140 filed Oct. 2, 2002.

FIELD OF THE INVENTION

This invention relates to an injection molding apparatus, and more particularly to a flow mixing device for an injection molding apparatus.

BACKGROUND OF THE INVENTION

The use of manifolds in injection molding apparatuses to transfer melt from a melt source to one or more mold cavities is well known. In many instances, it may be desired to mix a melt flow in a manifold, due to the configuration of a runner in the manifold, the composition of the melt flow and/or other parameters relating to the injection molding application. For example, it may be that a mixing device is used for the balancing of a manifold, to prevent certain mold cavities from receiving melt at a higher temperature and at a higher pressure than other mold cavities.

A well known device for mixing melt flow in a runner of a manifold is a static mixer. An example of such a mixer is disclosed in European Patent Application No. 88108394.3 (Halar et al.). Halar et al. discloses a mixer which is positioned in a runner, and which has a number of radially extending vanes. The vanes are twisted, and thus interrupt and twist a melt flow to cause mixing of the melt flow.

Another mixing device is disclosed in U.S. Pat. No. 4,123,496 (Gallizia et al.). Gallizia et al. discloses a mixing device for the purpose of balancing a manifold. The mixing device is configured to rearrange strata of a shear heated melt flow, so that strata that are hotter are mixed with strata that are colder. The mixing device divides a melt flow in a runner into a number of smaller melt channels, which reposition the portions of the melt flow, and then discharge the melt flow back into the runner.

All such static mixing devices include a number of dead zones, where melt flow is inhibited, and which are difficult to clean, during a changeover from one melt type to another. Furthermore, such mixing devices represent a relatively large pressure drop for a melt flow.

U.S. Pat. No. 6,077,470 (Beaumont) discloses another way of balancing a manifold, whereby the runners are configured to reorient a melt flow, so that the melt flow divides evenly at a split. Beaumont's device does not mix a melt flow, but instead reorients it so that non-uniformities in the melt flow will divide evenly at a split.

U.S. Pat. No. 5,683,731 (Deardruff et al) discloses a redistributor device for dividing a melt flow evenly upstream from an X-type split, where the melt is ultimately split into four downstream runners. The redistributor device has four internal passages which draw melt from different parts of a non-uniform melt flow and redistributes them so that non-uniformities are divided evenly in each of the downstream runners. The device of Deardruff et al. has several drawbacks. The internal passages are relatively difficult to clean. Furthermore, the device does not mix a melt flow, but instead divides it into portions and redistributes the portions, so the downstream melt flows may not be uniform themselves.

A continuing need therefore exists for new devices for the mixing of a melt flow and for the balancing of a manifold in an injection molding apparatus.

SUMMARY OF THE INVENTION

In a first aspect, the invention is directed to a mixing device for use with a manifold in an injection molding apparatus. The mixing device comprises a body, having a melt channel therethrough. The melt channel has a plurality of increasing sections which have an increasing cross-sectional area in a downstream direction, and a plurality of decreasing sections which have a decreasing cross-sectional area in a downstream direction. The increasing and decreasing sections alternate with each other.

In a second aspect, the invention is directed to a method of making a mixing device for use in a manifold in an injection molding apparatus. The method comprises:

(a) providing a first block of material having a first surface;

(b) machining a channel on the first surface of the first block of material, using a machining tool;

(c) during step (b), moving the machining tool and the first block of material relative to each other in a direction that is substantially perpendicular to the first surface, so that the machining tool machines at alternately increased and decreased depth in the first block of material;

(d) providing a second block of material having a second surface for mating with the first surface on the first block of material; and (e) mating the first and second surfaces.

In a third aspect, the invention is directed to a method of mixing a melt flow in a runner in an injection molding apparatus. The method comprises:

passing the melt flow through a channel having a plurality of decreasing and increasing cross-sectional areas.

In a fourth aspect, the invention is directed to an injection molding apparatus comprising a manifold and a mold cavity block. The manifold has a melt source inlet, and a runner downstream from the melt source inlet. The runner has a mixing section. The mixing section has a plurality of increasing sections which have an increasing cross-sectional area in a downstream direction and a plurality of decreasing sections which have a decreasing cross-sectional area in a downstream direction. The increasing and decreasing sections alternate with each other. The mold cavity block has a mold cavity downstream from the runner.

In a fifth aspect, the invention is directed to a manifold for an injection molding apparatus. The manifold has a melt source inlet, and a runner downstream from the melt source inlet. The runner has a mixing section. The mixing section has a plurality of increasing sections which have an increasing cross-sectional area in a downstream direction and a plurality of decreasing sections which have a decreasing cross-sectional area in a downstream direction. The increasing and decreasing sections alternate with each other.

In a sixth aspect, the invention is directed to a method of mixing a melt flow in an injection molding apparatus, comprising:

(a) alternately increasing and decreasing the average velocity of the melt flow through a melt channel in the injection molding apparatus a plurality of times.

In a seventh aspect, the invention is directed to a method of mixing a melt flow in an injection molding apparatus, comprising:

(a) alternately subjecting the melt flow to an increasing and decreasing pressure in a melt channel in the injection molding apparatus.

In an eighth aspect, the invention is directed to an injection molding apparatus comprising an injection manifold, a plurality of injection nozzles, and a plurality of mold cavities. The injection manifold has a plurality of manifold melt channels adapted to guide a melt flow. At least a portion of at least one manifold melt channel has a generally circular cross-section in a plane perpendicular to the direction of melt flow and has a diameter in the plane that varies along the direction of melt flow. The plurality of injection nozzles are in fluid communication with the manifold melt channels. The plurality of mold cavities are in communication with the nozzles.

In a ninth aspect, the invention is directed to an injection molding apparatus comprising an injection manifold, a plurality of injection nozzles, and a plurality of mold cavities. The injection manifold has a plurality of manifold melt channels adapted to guide a melt flow. At least a portion of at least one manifold melt channel has a melt channel axis and is configured to provide a melt flow rate that varies along the melt channel axis. The plurality of injection nozzles are in fluid communication with the manifold melt channels. The plurality of mold cavities are in communication with the nozzles.

In a tenth aspect, the invention is directed to an injection manifold. The injection manifold includes a manifold body. The manifold body has a plurality of manifold melt channels defined therein for guiding a melt flow. At least a portion of at least one melt channel is a melt mixing portion having a melt channel axis and having a plurality of juxtaposed sections having different cross-sectional shapes along the melt channel axis.

In an eleventh aspect, the invention is directed to an injection molding apparatus comprising an injection manifold, a plurality of injection nozzles, and a plurality of mold cavities. The injection manifold has a plurality of manifold melt channels adapted to guide a melt flow. At least a portion of at least one manifold melt channel has a melt channel axis and has a generally circular cross-section about the melt channel axis and has a plurality of portions along the melt channel axis having alternating increasing and decreasing diameters. The plurality of injection nozzles are in fluid communication with the manifold melt channels. The plurality of mold cavities are in communication with the nozzles.

In a twelfth aspect, the invention is directed to an injection molding apparatus comprising an injection manifold, a plurality of injection nozzles, and a plurality of mold cavities. The injection manifold has a plurality of manifold melt channels adapted to guide a melt flow. At least a portion of at least one manifold melt channel has a melt channel axis and has a generally circular cross-section about the melt channel axis and has a diameter that varies along the melt channel axis. The plurality of injection nozzles are in fluid communication with the manifold melt channels. The plurality of mold cavities are in communication with the nozzles.

In a thirteenth aspect, the invention is directed to an injection molding apparatus comprising an injection manifold, a plurality of injection nozzles, and a plurality of mold cavities. The injection manifold has a plurality of manifold melt channels adapted to guide a melt flow. At least a portion of at least one manifold melt channel has a melt channel axis and is configured to provide a melt flow velocity that varies along the melt channel axis. The plurality of injection nozzles are in fluid communication with the manifold melt channels. The plurality of mold cavities are in communication with the nozzles.

BRIEF DESCRIPTION OF THE DRAWINGS

For a better understanding of the present invention and to show more clearly how it may be carried into effect, reference will now be made by way of example to the accompanying drawings, showing articles made according to a preferred embodiment of the present invention, in which:

FIG. 4a is a view of a milling head that can be used to make the mixing device shown in FIG. 1;

FIG. 4b is an end view of the mixing device shown in FIG. 1;

FIG. 4c is an end view of an alternative mixing device in accordance with the present invention;

DETAILED DESCRIPTION OF THE INVENTION

Figure 1:
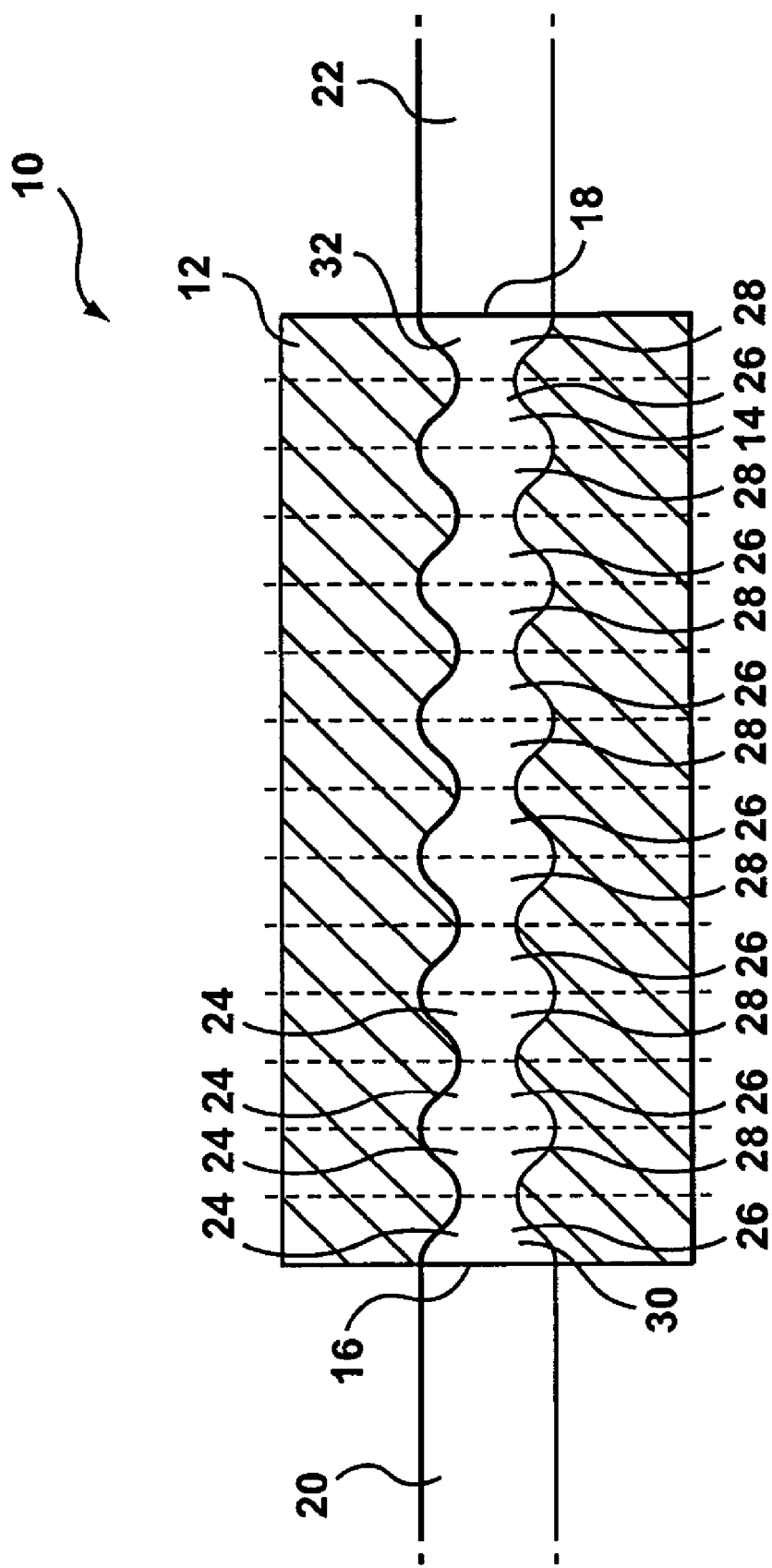
FIG. 1 is a side sectional view of a mixing device in accordance with a first embodiment of the present invention.

Reference is made to FIG. 1, which shows a mixing device in accordance with the present invention, shown generally at 10. Mixing device 10 can be used to mix a melt flow in a runner in an injection molding apparatus. Mixing device 10 includes a body 12, having a melt channel 14 therethrough. Melt channel 14 has an inlet 16 and an outlet 18, and a melt channel axis CL. The inlet 16 and outlet 18 preferably generally mate with the upstream and downstream runner portions 20 and 22 respectively. The upstream and downstream runner portions 20 and 22 may have the same shape and cross-sectional area or, alternatively, they may have different shapes and/or different cross-sectional areas.

Mixing device 10 has a plurality of sections 24, which may be decreasing sections 26 or increasing sections 28. The decreasing sections 26 have a decreasing cross-sectional area in a downstream direction ie. in the direction of melt flow, which in this case is in the direction of the axis CL. The increasing sections 28 have an increasing cross-sectional area in a downstream direction. The decreasing and increasing sections 26 and 28 alternate with each other.

The decreasing sections 26 and the increasing sections 28 may each have the same average cross-sectional area, as shown in FIG. 1.

Preferably, the transitions between the decreasing and increasing sections 26 and 28 are smooth, as shown, to reduce the tendency for dead zones to exist in the melt flow, and to facilitate cleanout of the mixing device 10. Cleanouts, for example, may be desirable between runs of different compositions or colours of melt through the mixing device. Each of the sections 24 may be smoothly curved, as shown, to reduce pressure drop losses through the mixing device 10, and to further facilitate cleanout.

The mixing device 10 begins with a first section 30. Section 30 may be, for example, a decreasing section 26. Alternatively, section 30 may be an increasing section 28. Similarly, the last section, which is shown at 32, may be, for example, an increasing section 28, or may alternatively be a decreasing section 26.

A melt flow passing through mixing device 10 repeatedly encounters decreasing sections 26 and increasing sections 28. The melt flow remains coherent throughout the mixing device. In other words it does not divide into two or more discrete flow paths. The mass flow rate is constant along the melt channel 14. Therefore as the melt flow passes along the channel with its plurality of increasing and decreasing cross-sectional areas, the melt will undergo changes in average velocity and average pressure drop. More particularly, the pressure drop over a decreasing section 26 increases along the length of the section (ie. along the axis CL), and the average pressure drop over an increasing section 28 decreases along the length of the section. Furthermore, when the melt passes through a decreasing section 26, the average velocity of the melt increases and when the melt passes through an increasing section 28 the average velocity of the melt decreases.

When encountering a decreasing section 26, the peripheral portions of the melt flow are brought closer to the axis of the channel 14. When the melt flow encounters an increasing section 28, some portions of the melt flow are moved away from the axis of the channel 14. The physical movement of the melt as the channel is alternately constricted and expanded and the changes in velocity and pressure drop cause the melt flow to be mixed. The greater the number of alternating decreasing and increasing sections 26 and 28, the better the mix of the melt flow that can be achieved. FIG. 1 illustrates a device having fourteen such sections.

The shapes of the decreasing and increasing sections 26 and 28, and the cross-sectional areas at the transitions between the sections 26 and 28 may be selected based on the properties of the melt flow and the permissible pressure drop losses of the overall system in which the mixing device is used. Furthermore, the decreasing sections 26 need not all be identical to one another, and similarly, the increasing sections 28 need not all be identical. Each section may have a unique shape. Furthermore, all the sections 26 and 28 need not all start with the same cross-sectional area or end with the same cross-sectional area.

Figure 2:
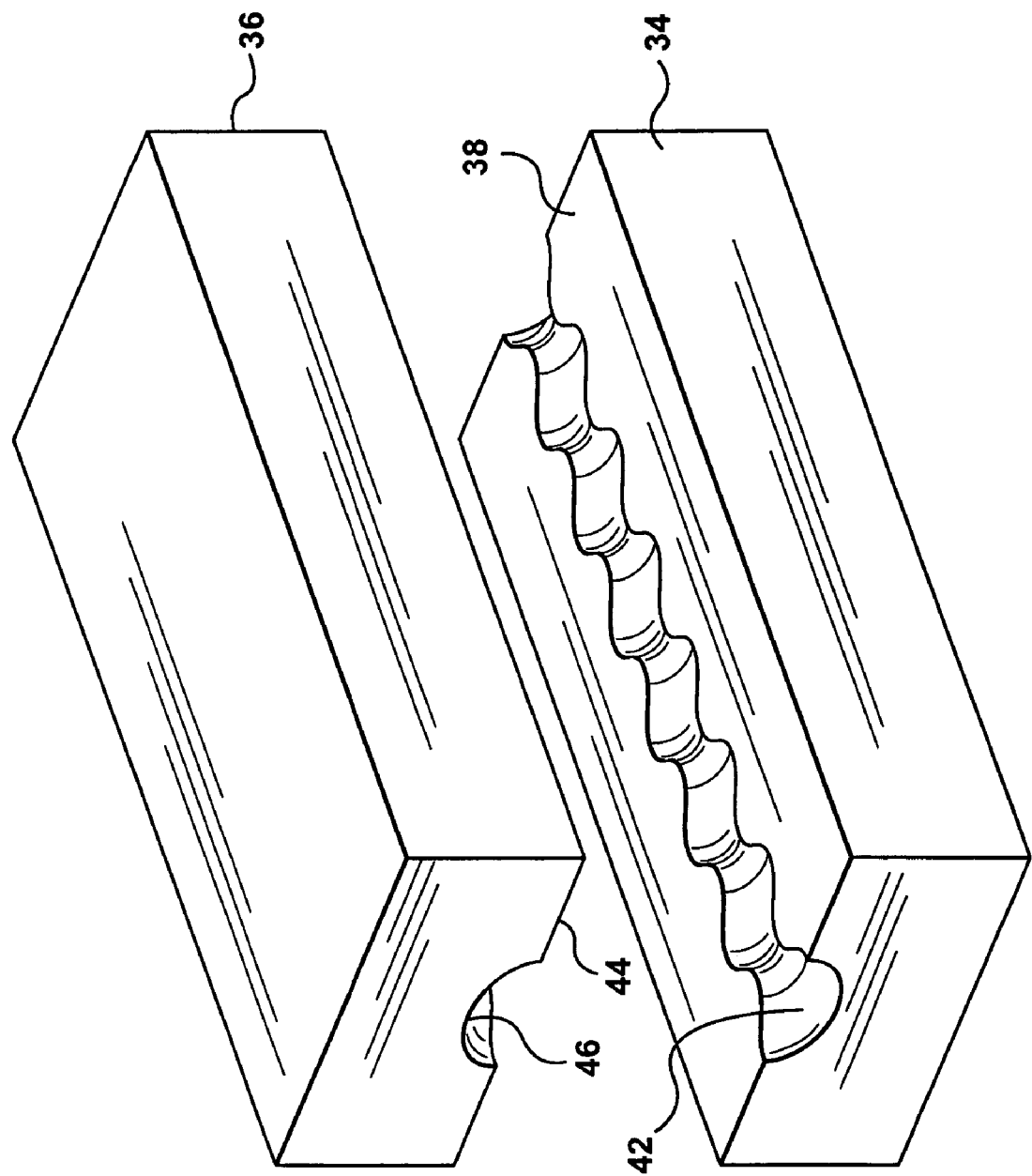
FIG. 2 is a perspective view of two portions of the mixing device shown in FIG. 1.
Figure 3:
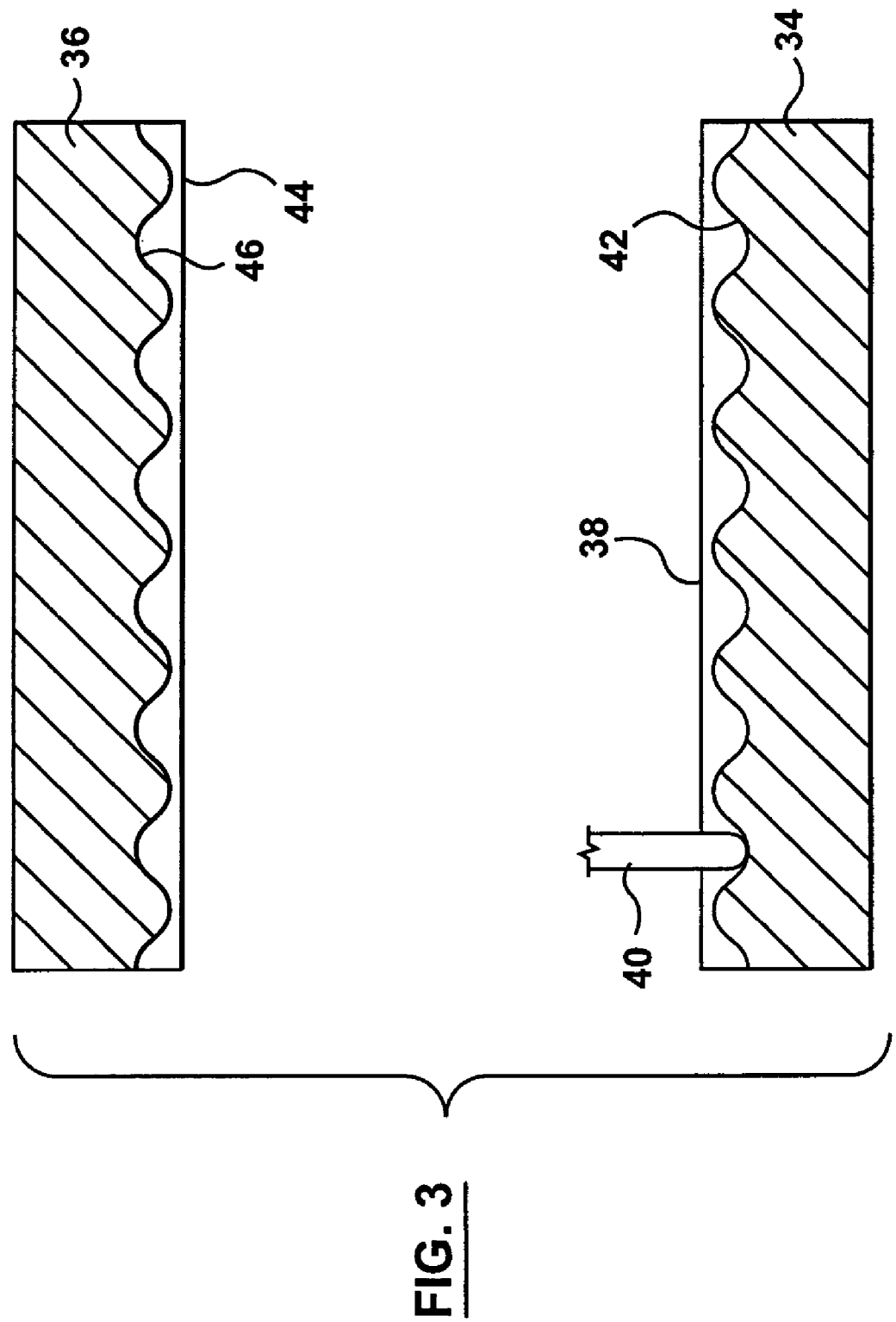
FIG. 3 is a side sectional view of the portions shown in FIG. 2.

Reference is made to FIGS. 2 and 3, which illustrate the method for making the mixing device 10. The mixing device 10 may be made from first and second blocks 34 and 36, whereby a portion of the melt channel 14 is machined into each block. Block 34 has a first mating surface 38. A mill (not shown), having a milling head 40 may be used to machine a channel, which forms a first portion 42 of the melt channel 14. The milling head 40 may have any suitable shape. For example, the milling head 40 may be a hemispherical milling head, (ie. a milling head for machining a bore having a hemispherical bottom, or a slot having a rounded bottom). Furthermore, milling head 40 may be used to cut the channel in a single pass, if the width of the milling head 40 is equal to the maximum width of the channel.

The first melt channel portion 42 may make up half of the melt channel 14, or may alternatively make up any suitable portion of the melt channel 14. To machine the melt channel portion 42, the milling head 40 is moved laterally across the surface 38, parallel to the direction of intended flow, and the milling head 40 is moved alternately between an increased depth and a decreased depth into the block 34 as the milling head 40 moves laterally across surface 38. The milling head 40 may be moved along a sinusoidal path across the surface 38 in the plane of FIG. 3, so that the profile of the machined surface of the melt channel portion 42 is sinusoidal in the plane of FIG. 3. Alternatively, any suitable means of moving the milling head 40 and the block 34 relative to each other may be used for the machining of the melt channel portion 42. For example, rather than moving the milling head 40 across the surface 38, the block 34 may be moved over the milling head 40 to machine the melt channel portion 42. As a further alternative, both the block 34 and the milling head 40 may be moved with respect to each other, to machine the melt channel portion 42.

Similarly to the first block 34, the second block 36 may have a second mating surface 44. The milling head 40 may be used to machine a similar sinusoidal channel, forming a second melt channel portion 46 into the second mating surface 44. In this case, as shown in FIG. 3, the melt channel 14 has two sinusoidal surfaces in the plane of FIG. 3. As an alternative, any other suitable path may be machined into one of the blocks 34 or 36. For example, one of the blocks 34 or 36 may have a path machined therein that is at a constant depth. Alternatively, one of the blocks may have no path machined therein. In this case, the melt channel portion 42, (or 46 depending on which block 34 or 36 has been machined), contains the entire volume of the melt channel 14.

Once the blocks 34 or 36 or both have been machined as desired, they may be joined by any suitable means known. For example, they may be brazed or welded together. Alternatively, they may each be placed in a receiving pocket in a manifold plate of an injection molding apparatus. In this case, the mixing device blocks may be joined together by joining the manifold plates in which they rest, together.

Reference is made to FIGS. 4a, 4b and 4c, which illustrate two alternative portions of the method of making the mixing device 10, using a hemispherical milling head 40. In this case both blocks 34 and 36 are machined as mirror images of one another. In the case where the milling head 40 is hemispherical, it has a radius R. As shown in FIG. 4b, the melt channel portions 42 and 46 may be cut so that their maximum depth $D_{MAX}$ into each block 34 and 36 is the same as the radius R of the milling head 40. The minimum depth $D_{MIN}$ is less than R. This way, the melt channel 14 may be made circular at the sections of maximum cross-sectional area, and football-shaped at all other sections. Thus, in the case where the inlet 16 and outlet 18 represent the maximum depth, (which can occur when the melt channel 14 begins with a decreasing section 26 and ends with an increasing section 28), the inlet 16 and outlet 18 may be made circular. A circular inlet 16 and a circular outlet 18 facilitate a smooth alignment of the mixing device 10 with a round runner, such as is found in most injection molding apparatuses. It will be noted that in the case where the melt channel 14 is football-shaped, either over its entire length or between portions that are circular in cross section, it remains free of any discontinuities in the axial direction. A discontinuity is an abrupt change in the shape of the surface of the mixing device. There will be no discontinuities as long as the depth of cut of the cutting tool is changed progressively as the cutting tool moves laterally along surface 38 or 44 respectively.

An end view of a mixing device 10' in accordance with an alternative embodiment of the present invention is shown in FIG. 4c. Mixing device 10' is similar to mixing device 10, except that mixing device 10' begins with an increasing section 28'. The hemispherical milling head 40 of FIG. 4a may be used to cut the melt channel portions 42' and 46' to any suitable maximum and minimum depths. For example, the milling head 40 may be used to cut melt channel portion 42' whereby the minimum depth $D_{MIN}'$ of the melt channel portion 42' is the same as radius R of the milling head 40. This way, the melt channel 14' will be circular at the minimum depth $D_{MIN}'$, whereas at the maximum depth $D_{MAX}'$, the melt channel 14' will be capsule-shaped. Thus, in the case where the inlet 16' and outlet 18' represent the minimum depth $D_{MIN}'$, (which can occur when the melt channel 14' begins with a increasing section 28' and ends with an decreasing section, which cannot be seen in the view shown), the inlet 16' and outlet 18' may be made circular. In this case, the melt channel 14' is also free of any discontinuities in both the axial and transverse directions as long as the depth of the cut is changed progressively as discussed above.

As an alternative method for making mixing devices 10 or 10' the mixing devices may be cast as a single piece, rather than being machined from two separate blocks.

Figure 5:
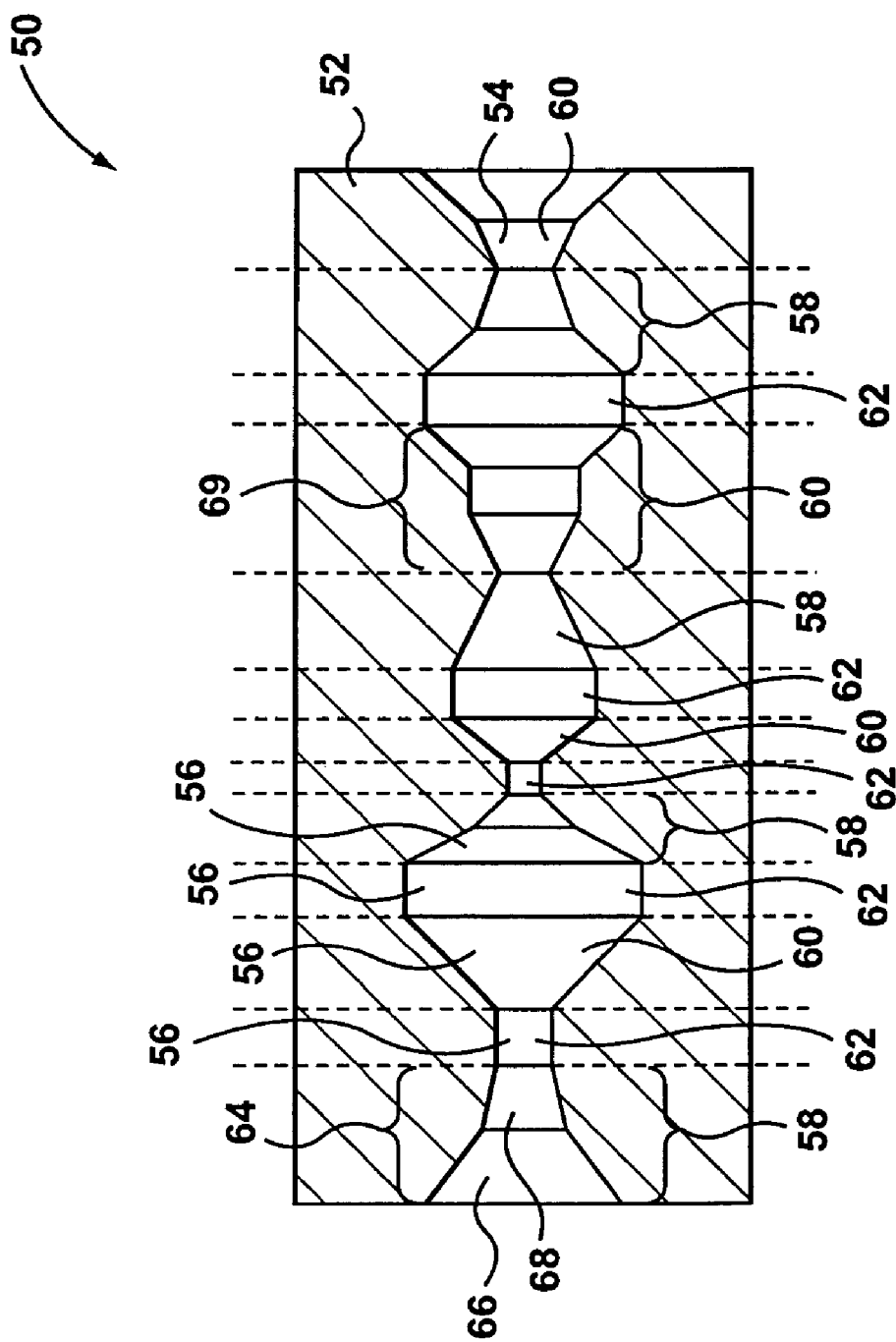
FIG. 5 is a side sectional view of an alternative embodiment of a mixing device in accordance with the present invention.

Reference is made to FIG. 5, which shows a mixing device 50 in accordance with another embodiment of the present invention. Mixing device 50 has a body 52 and a melt channel 54 therein. The melt channel 54 is made up of a plurality of sections 56, including a plurality of decreasing sections 58 and a plurality of increasing sections 60. Mixing device 50 may also include a plurality of constant sections 62, (ie. they do not change in shape or cross-sectional area), between any decreasing section 58 and any increasing section 60. Mixing device 50 is similar to mixing device 10 in that the decreasing sections 58 and increasing sections 60 alternate with each other. Sections 58 and 60 may be compound sections, in that they may include two or more subsections. For example, the decreasing section shown at 64 includes two subsections 66 and 68, which both decrease in cross-sectional area. It is alternatively possible to have a increasing section 60, that has subsections that are increasing and subsections which are constant, such as is shown at increasing section 69. Similarly, it is alternatively possible to have decreasing sections 58 with constant subsections.

The sections 56 transition discretely to each other, (ie. the transitions between adjacent sections include discontinuities). These discontinuities may induce higher pressure losses along the flow path and are probably therefore not as desirable from this point of view. However, it may be easier to manufacture the mixing device by including such discontinuities such as by using and drilling part conical portions to create the melt channel 14. It is also contemplated that a mixing device in accordance with the present invention may include transitions having discontinuities and transitions that are smooth.

Mixing device 50 may be made by any suitable method, such as by machining portions of the melt channel 54 in two blocks, as described above for mixing device 10. Alternatively, mixing device 50 may be made from a mold, as a single piece, rather than from two separate blocks.

In this embodiment, the decreasing sections 58 and 60, as shown in FIG. 5, have different cross-sectional areas.

Figure 6A:
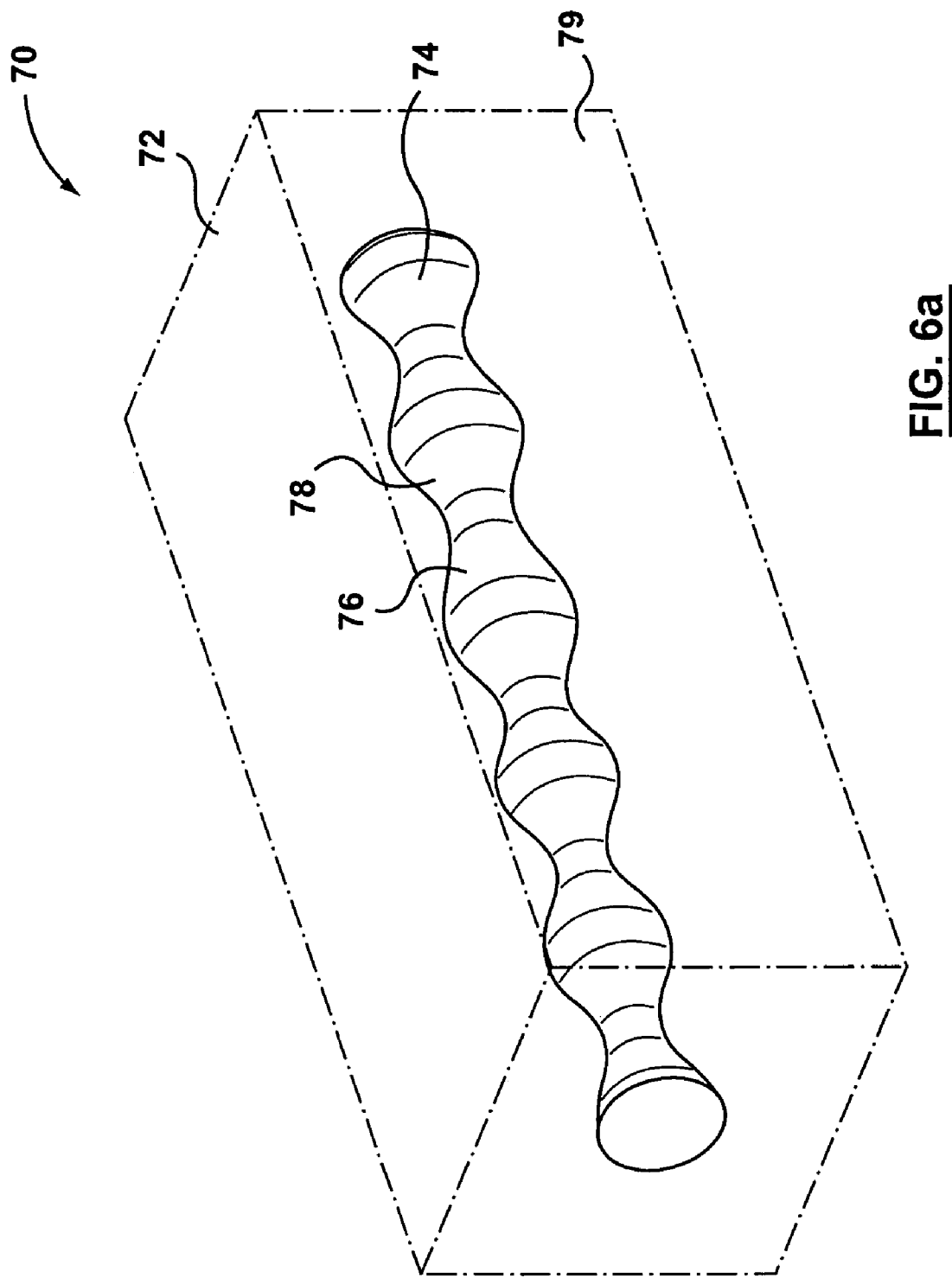
FIG. 6a is a transparent perspective view of another alternative embodiment of a mixing device in accordance with the present invention.

Reference is now made to FIG. 6a, which shows a mixing device 70. Mixing device 70 includes a body 72 and a melt channel 74. Mixing device 70 comprises decreasing and increasing sections 76 and 78, and is generally similar to mixing device 10.

Mixing device 70 has an outer surface 79, which may have, for example, a four-sided square cross-sectional shape.

Figure 6B:
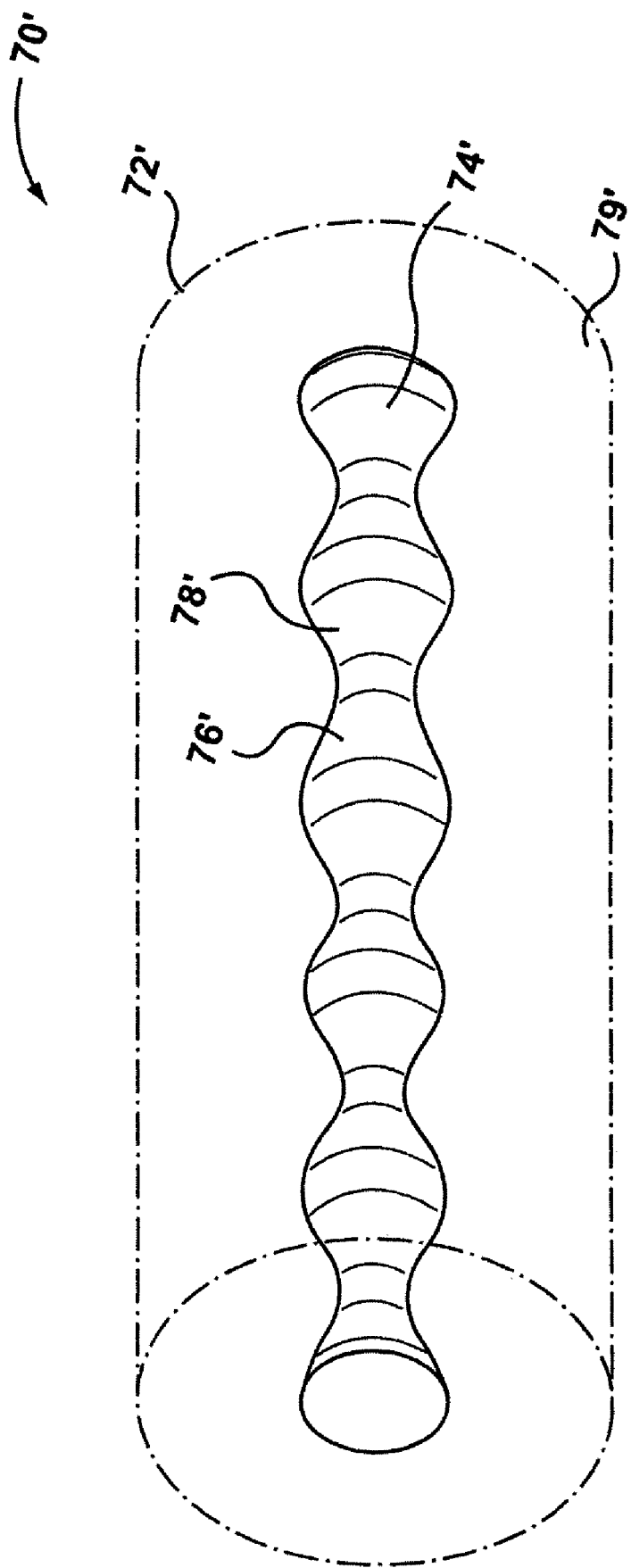
FIG. 6b is a transparent perspective view of yet another alternative embodiment of a mixing device in accordance with the present invention.

As shown in FIG. 6b, a mixing device 70' is shown, which is similar to mixing device 70, and has a body 72', with a melt channel 74', having decreasing and increasing sections 76' and 78', which are similar to body 72, melt channel 74, and decreasing and increasing sections 76 and 78 respectively. Mixing device 70' has an outer surface 79', that may be for example, cylindrical, for mounting in a cylindrical receiving aperture in a manifold. In this case the mixing device act like a separate manifold insert whose function is to reduce and increase the diameter of the melt channel. This insert can be made of any suitable material which is identical or different than the material used to make the manifold. This mixer insert is easier to install in the manifold if the manifold is made of two pieces that are joined together by welding, heat fusion or brazing.

By casting the mixing device, rather than machining it out of blocks, the shape of the melt channel 74 may be controlled as desired throughout its length, without any of the limitations imposed by a machining tool. For example, the melt channel 74 may be kept to any other desired constant shape or changing shape in cross-section along its length, and may increase and decrease in size according to any desired parameters. For example, the melt channel 74 may be kept circular along its entire length, thus reducing the surface area of the melt channel 74 (and correspondingly reducing surface-induced drag).

The melt channel 74 may be made to have any desired suitable longitudinal shape. For example, the melt channel 74 may be made to have a twin-sinusoidal shape to the melt channel in all axial planes. Alternatively, the melt channel 74 may be provided with a twin-sinusoidal shape in at least one axial plane.

While it is possible to machine melt channel 74 using a machining tool, it may represent a relatively difficult and time consuming process. It may, however, be relatively easier to cast a piece having the melt channel 74 therein.

Figure 7:
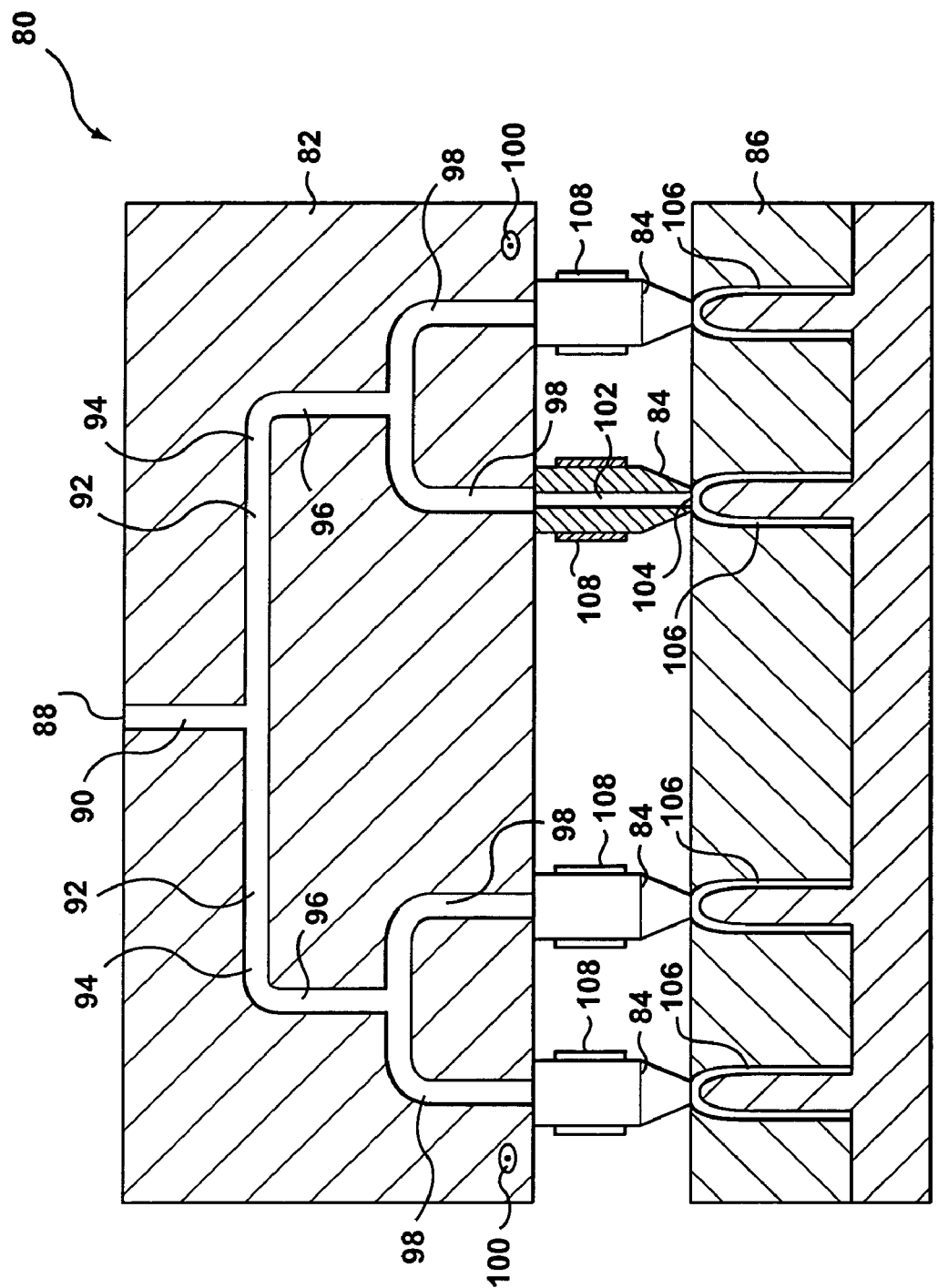
FIG. 7 is a sectional view of an injection molding apparatus of the prior art.

Reference is made to FIG. 7, which shows an injection molding apparatus, of the prior art, shown generally at 80. Molding apparatus 80 has a manifold 82, a plurality of nozzles 84, and a cavity plate 86. Manifold 82 has a melt source inlet 88 for receiving melt from a melt source (not shown). Melt source inlet 88 leads to a primary runner 90. Primary runner 90 branches into two secondary runners 92. Secondary runners 92 have a first portion 94, a 90 degree bend and then a second portion 96 which is perpendicular to first portion 94. Second portion 96, in turn, branches into tertiary runners 98. Tertiary runners 98 lead into nozzles 84. Heaters 100 are used to heat the flow of melt through manifold 82.

Nozzles 84 have nozzle channels 102 which communicate with tertiary runners 98 in manifold 82. Nozzle channels 102 end at gates 104, which open into cavities 106 in cavity plate 86. Heaters 108 are used to heat the flow of melt through nozzles 84.

Figure 8:
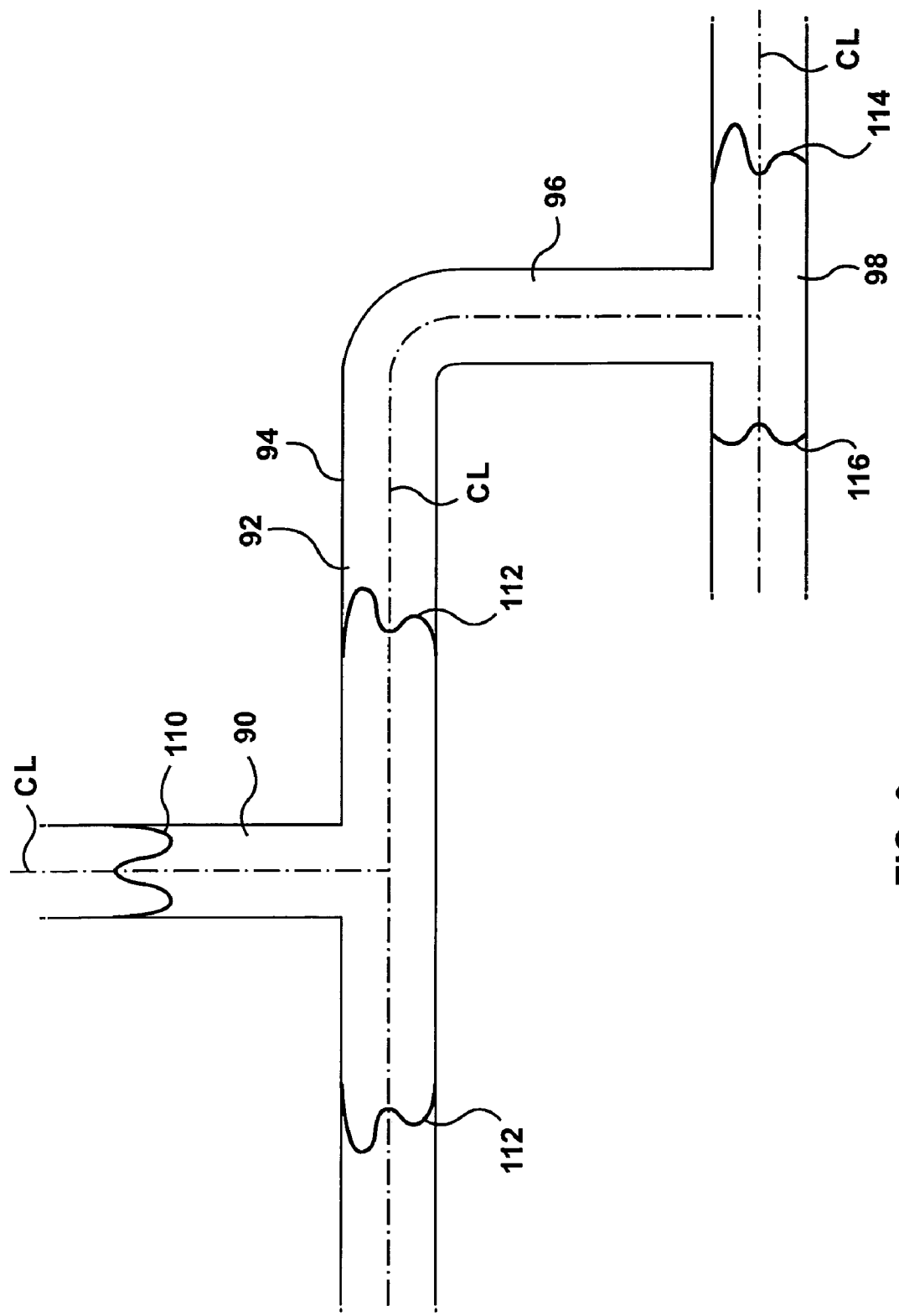
FIG. 8 is a sectional view of a portion of the runners of the prior art injection molding apparatus shown in FIG. 7.

Reference is now made to FIG. 8, which shows the primary runner 90 and a portion of the secondary and tertiary runners 92 and 98. For ease of illustration, the surrounding manifold is not shown. As the melt flows through runners in the molding apparatus, the melt that is proximate the wall surface of the channel becomes heated relative to the melt in the middle of the channels, as a result of shear heating and other factors. A curve showing the relative shear in the melt in the primary runner 90 is shown at 110. The curve 110 is referred to as a shear profile. It will be noted that the shear profile 110 is not uniform across the cross-section of the melt flow. It will also be noted that the shear profile is, however, symmetric about the centerline CL of the melt flow. The shear profile 110 shows that the melt flow has more shear at some point in between the periphery and the center. In general, the shear profile of the melt flow is an indicator of certain other properties of the melt. For example, the shear profile is an indicator of the temperature profile of the melt flow. Portions of the melt flow that are subject to more shear, have as a consequence, higher temperatures. Furthermore, a melt flow may have different flow characteristics at different temperatures, and will flow at different rates.

At the junction where the primary runner 90 joins the first portions 94 of the secondary runners 92, the melt flow is divided into two flows, each of which has a shear profile 112. The shear profiles 112 are similar to each other, having similar overall average temperatures, and similar overall average amounts of shear. Each profile 112 is however, asymmetric, having more shear in the part of the melt flow shown above the centerline CL, than in the part below the centerline CL. Due to the asymmetry in the melt flow in the secondary runners 92, the melt flows in the tertiary runners 98 will not have similar shear profiles. The overall average temperatures of the melt flow in the tertiary runners 98 will not be the same, and the flow rates in the tertiary runners 98 will not be the same. This is illustrated by the shear profiles 114 and 116 of the melt flow in the tertiary runners 98. This difference in flow rate and in temperature ultimately causes variations in mold cavity pressures, and in the quality of molded parts.

Figure 9:
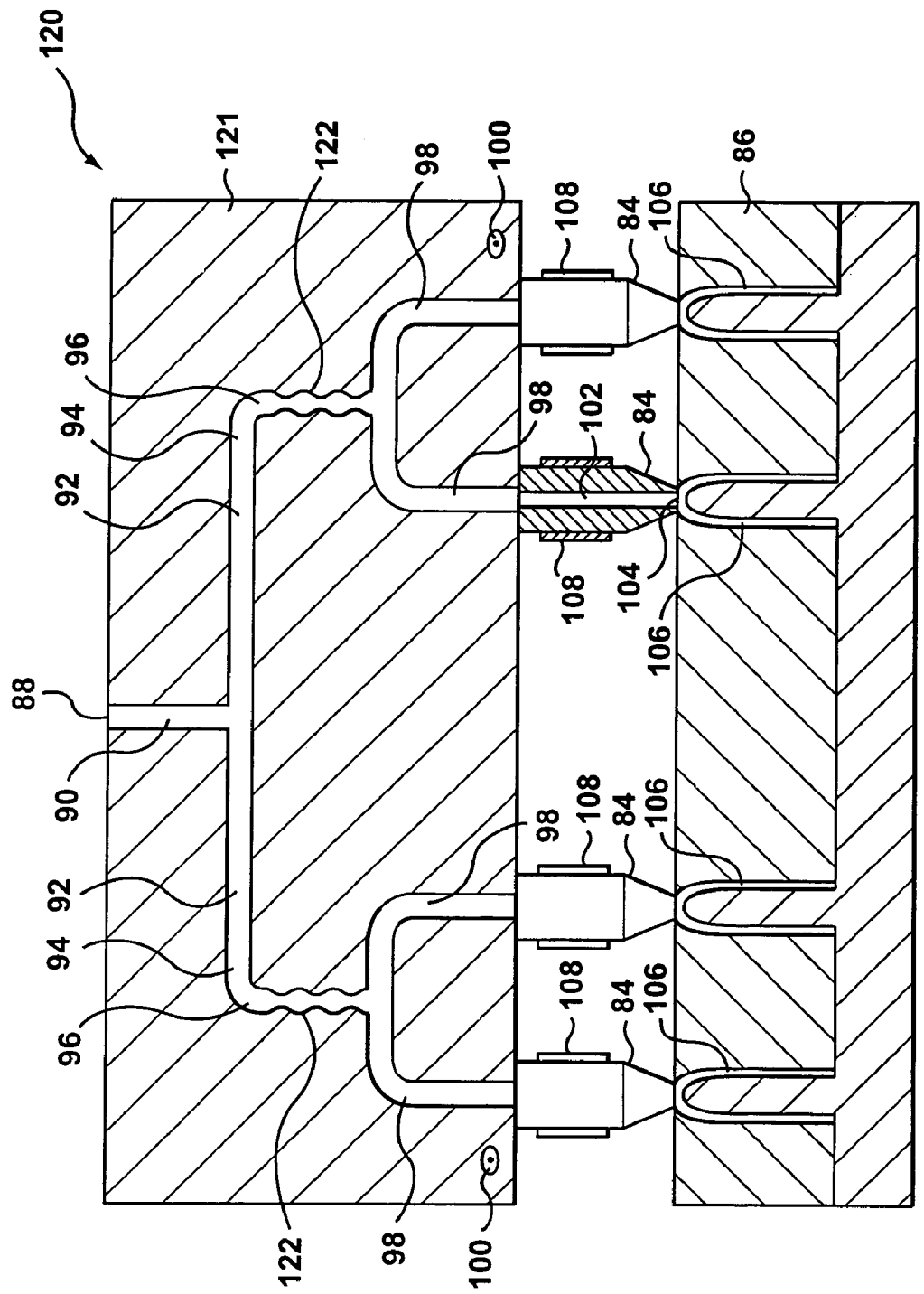
FIG. 9 is a sectional view of an injection molding apparatus having a plurality of mixing devices in accordance with the present invention.

Reference is now made to FIG. 9, which illustrates an injection molding apparatus 120, which is similar to injection molding apparatus 80, but which includes a manifold 121, which has at least one mixing section 122 in accordance with the present invention. The mixing section 122 is integrally formed into manifold 82 and may be similar to the melt channels 14, 54 or 74 in mixing devices 10, 10', 50 or 70. Alternatively, the mixing section 122 may be replaced by any of the mixing devices 10, 10', 50 or 70, which would be a separate block that is received in a pocket within manifold 82. By including mixing section 122 in the runners 92 upstream of the split into runners 98, a melt flow passing through the mixing section 122 is mixed so that the shear profile, and therefore, the temperature profile and flow characteristics are more uniform and more symmetrical.

Figure 10:
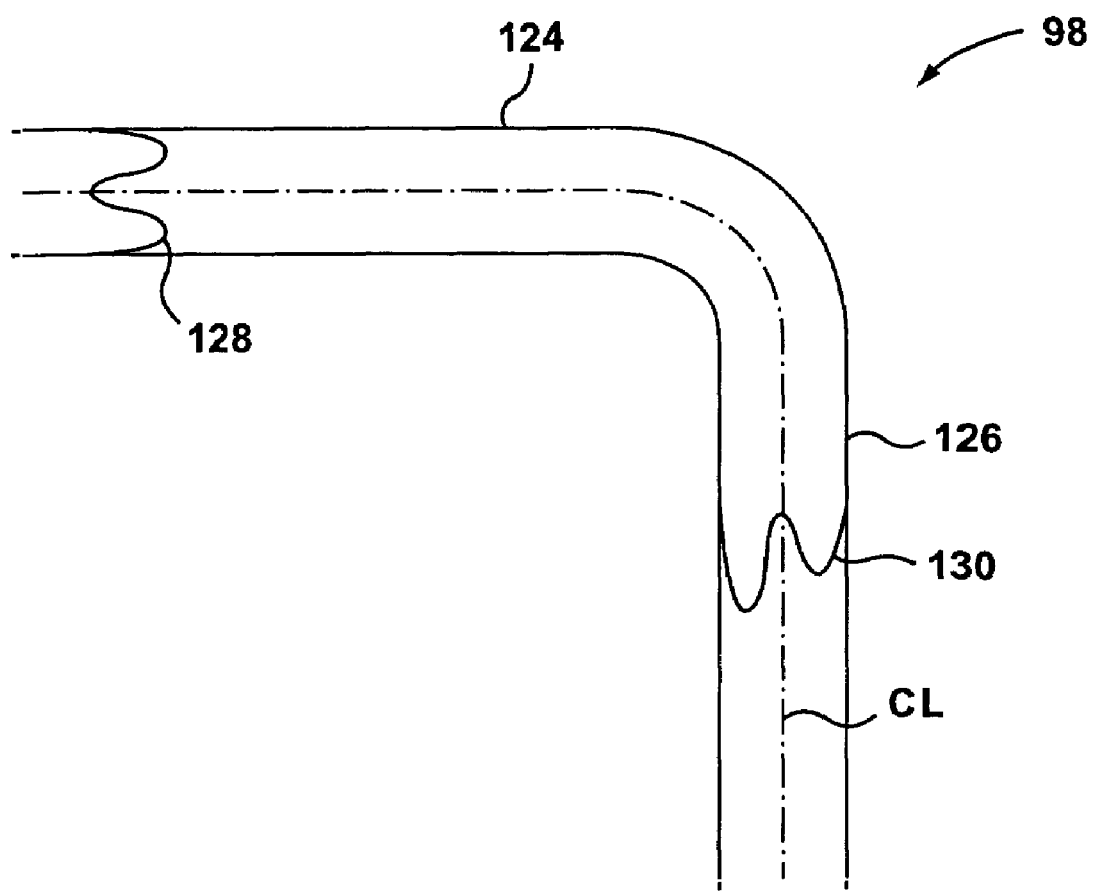
FIG. 10 is a sectional view of another portion of the runners of the prior art injection molding apparatus shown in FIG. 7.
Figure 11:
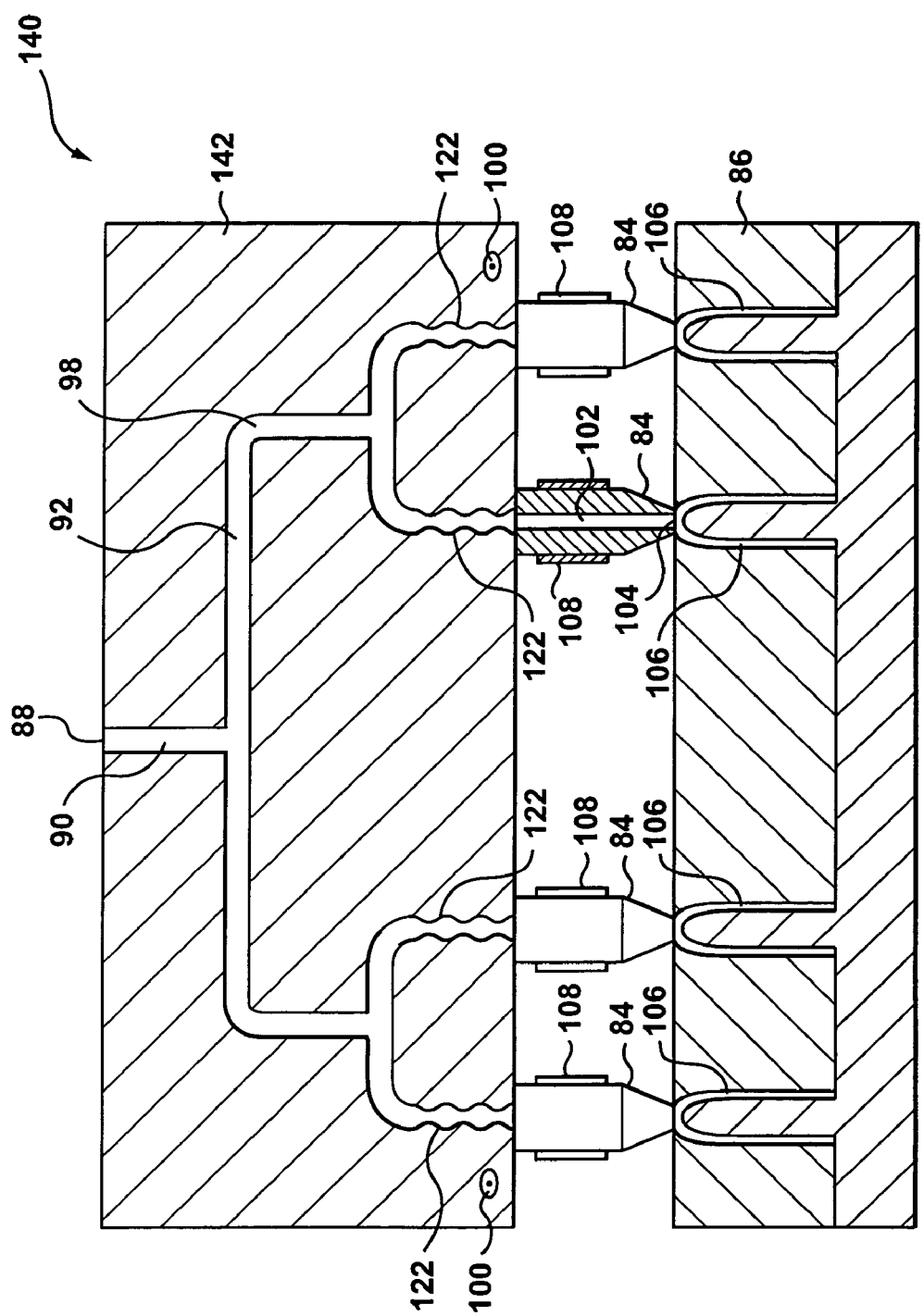
FIG. 11 a sectional view of another injection molding apparatus having a plurality of mixing devices in accordance with the present invention.

Reference is now made to FIG. 10, which shows the melt flow in tertiary runner 98 of the injection molding apparatus 80 of the prior art injection molding apparatus of FIG. 7. Tertiary melt channel 98 includes a first portion 124, which is followed by a 90 degree bend, and a second portion 126. The melt flow in the first portion 124 has a shear profile, shown at 128, which may be, for example, symmetrical. After the 90 degree bend, the shear profile is changed, so that the portion of the melt flow adjacent the inside of the bend has an increased amount of shear, relative to the portion of melt flow adjacent the outside of the bend. Thus, the shear profile after the bend may be as shown at 130. Depending on the configuration of the mold cavity 106, the asymmetric flow characteristics of the melt flow at 130 may prevent the melt flow from completely filling the mold cavity 106, which can result in unsatisfactory molded parts. Furthermore, this problem with filling the mold cavity 106 can result from any non-uniformity in the shear profile of the melt flow, depending on the configuration of the mold cavity 106. In other words, a melt flow may be symmetrical but non-uniform, and may, depending on the mold cavity configuration, cause poor quality parts to be produced. Thus, it may be desirable to include a mixing device 10, 10', 50 or 70 near the outlet of the manifold upstream from each mold cavity, as shown in FIG. 11. In FIG. 11, an injection molding apparatus 140 is shown, which is similar to molding apparatus 120, but which includes a manifold 142, having a mixing section 122, or alternatively, a mixing device 10, 10', 50 or 70, in each tertiary runner 98, upstream from each mold cavity 106. Preferably, the mixing sections 122 are positioned as close as possible to the outlets of the tertiary runners 98, so that the melt flow is relatively uniform when entering the nozzles 84 and ultimately when entering the mold cavities 106.

The layout of the runners in molding apparatuses 80 and 120 are exemplary only, and it will be noted that many other runner layouts with mixing sections 122 or mixing devices 10, 10', 50 or 70 are possible without departing from the present invention. For example, a mixing section 122 or mixing device 10, 10', 50 or 70 may be included in any runner in any manifold, upstream from a split where the melt flows would otherwise divide unevenly. Furthermore, for example, a mixing section 122 or mixing device 10, 10', 50 or 70 may be included in any runner near the outlet of a manifold, to improve the symmetry and/or the uniformity of the melt flow.

The injection molding apparatuses described have included a plurality of runners, leading to a plurality of nozzles, leading, in turn, to a plurality of mold cavities. Alternatively however, the mixing section 122 or mixing device 10, 10', 50 or 70 may be included in an injection molding apparatus having a single runner, a single nozzle and single mold cavity. In this case, the manifold would be referred to as a melt channel block. Furthermore, the mixing device 10, 10', 50 or 70 may be included in injection molding apparatuses that have multiple melt sources, and that have parallel runners that each receive melt from a different melt source and that co-inject the different melt flows into each mold cavity. As a further alternative, the mixing section 122 or mixing device 10, 10', 50 or 70 may be included in injection molding apparatuses having one or more melt sources, and a plurality of manifolds (ie. stack mold machines), whereby each manifold leads to a plurality of mold cavities.

The invention has been described in the context of an injection molding apparatus which is a hot runner molding apparatus, with a manifold, a separate mold cavity block, and a plurality of nozzles therebetween. Alternatively, the molding apparatus may be a cold runner type. In this case, the mold cavity block and the manifold are the same block. Also, in this case, nozzles are not required.

While the above description constitutes the preferred embodiments, it will be appreciated that the present invention is susceptible to modification and change without departing from the fair meaning of the accompanying claims.

The invention claimed is:

1. An injection molding apparatus, comprising:
   a manifold, said manifold having a melt source inlet, said manifold having a plurality of runners downstream from said melt source inlet, said manifold having at least one runner having a mixing device, said mixing device having a central melt channel with a plurality of increasing sections, which have an increasing cross-sectional area in the downstream direction, and a plurality of decreasing sections, which have a decreasing cross-sectional area in the downstream direction, said increasing and decreasing sections alternating with each other along a length of said central melt channel; and a mold cavity block, said mold cavity block having a mold cavity downstream from said runners.

2. The injection molding apparatus as claimed in claim 1, wherein each of said plurality of runners downstream from said melt source inlet includes a mixing device.

3. The injection molding apparatus as claimed in claim 2, wherein said mold cavity block has a mold cavity downstream from each of said plurality of runners.

4. The injection molding apparatus as claimed in claim 1, further comprising:
a plurality of manifolds, each manifold having a melt source inlet and at least one runner downstream from said melt source inlet, wherein each of said runners includes a mixing device; and
a plurality of mold cavity blocks having mold cavities downstream from each of said runners.

5. The injection molding apparatus as claimed in claim 1, wherein said mixing device is positioned adjacent a downstream end of said runner.

6. The injection molding apparatus as claimed in claim 2, wherein each of said mixing devices is positioned adjacent a downstream end of said runner.

7. The injection molding apparatus as claimed in claim 1, further comprising:
a nozzle having a nozzle channel, said nozzle channel being downstream from said at least one runner and upstream from said mold cavity.

8. The injection molding apparatus as claimed in claim 1, wherein the manifold includes a split in said at least one runner, whereby a melt flow in said runner is divided into a plurality of melt flows, and wherein said mixing device is positioned upstream of said split.

9. An injection molding apparatus comprising:
(a) an injection manifold having a plurality of manifold melt channels adapted to guide a melt flow, wherein at least a portion of at least one manifold melt channel has a generally circular cross-section in a plane perpendicular to the direction of melt flow and wherein said cross-section has a plurality of diameter values that varies alternatively and repeatedly along the direction of melt flow;
(b) a plurality of injection nozzles in fluid communication with the manifold melt channels; and
(c) a plurality of mold cavities in communication with the nozzles.

10. An injection molding apparatus comprising:
(a) an injection manifold having a plurality of manifold melt channels adapted to guide a melt flow, wherein at least a portion of at least one manifold melt channel has a melt mixing portion configured to provide a melt flow rate that varies alternatively and repeatedly along a melt channel longitudinal axis between an inlet and an outlet of said mixing portion;
(b) a plurality of injection nozzles in fluid communication with the manifold melt channels; and
(c) a plurality of mold cavities in communication with the nozzles.

11. An injection molding apparatus comprising:
a manifold having, a manifold body, the manifold body having a plurality of manifold melt channels defined therein for guiding a melt flow, wherein at least a portion of at least one melt channel is a melt mixing portion having a central melt channel and having a plurality of juxtaposed sections in series along a length of the central melt channel, wherein each section has a different cross-sectional area than an adjacent section.

12. An injection molding apparatus comprising:
(a) an injection manifold having a plurality of manifold melt channels adapted to guide a melt flow, wherein at least a portion of at least one manifold melt channel has a melt mixing section having a generally circular cross-section about a melt channel longitudinal axis with a plurality of portions having alternating increasing and decreasing diameters from an inlet to an outlet of the melt mixing section;
(b) a plurality of injection nozzles in fluid communication with the manifold melt channels; and
(c) a plurality of mold cavities in communication with the nozzles.

13. An injection molding apparatus comprising:
(a) an injection manifold having a plurality of manifold melt channels adapted to guide a melt flow, wherein at least a portion of at least one manifold melt channel has a melt channel axis and has a generally circular cross-section about the melt channel axis, wherein the melt channel has a melt mixing section having a central flow channel along the melt channel axis with a diameter that varies along a length of the melt mixing section from an inlet to an outlet thereof;
(b) a plurality of injection nozzles in fluid communication with the manifold melt channels; and
(c) a plurality of mold cavities in communication with the nozzles.

14. An injection molding apparatus comprising:
(a) an injection manifold having a plurality of manifold melt channels adapted to guide a melt flow, wherein at least a portion of at least one manifold melt channel has a melt mixing section that is configured to provide a melt flow velocity that varies along a melt channel central axis from an inlet to an outlet of the melt mixing section;
(b) a plurality of injection nozzles in fluid communication with the manifold melt channels; and
(c) a plurality of mold cavities in communication with the nozzles.

15. The injection molding apparatus according to claim 9, wherein said cross-section having a plurality of diameter values is part of a melt channel of a separate melt mixing device.

16. The injection molding apparatus according to claim 15, wherein said melt mixing device has a body made of two blocks each including a portion of the mixing device melt channel.

17. The injection molding apparatus according to claim 10, wherein said melt mixing portion is part of a melt channel of a separate melt mixing device.

18. The injection molding apparatus according to claim 16, wherein said melt mixing device has a body made of two blocks each including a portion of the mixing device melt channel.

19. The injection molding apparatus according to claim 11, wherein said juxtaposed sections in series are part of a separate melt mixing device.

* * * * *

UNITED STATES PATENT AND TRADEMARK OFFICE
CERTIFICATE OF CORRECTION

| | |
|---|---|
| PATENT NO. | : 7,270,538 B2 |
| APPLICATION NO. | : 10/674807 |
| DATED | : September 18, 2007 |
| INVENTOR(S) | : Robert Sicilia |

It is certified that error appears in the above-identified patent and that said Letters Patent is hereby corrected as shown below:

In column 12, claim 18, line 61, replace "16" with -- 17 --.

Signed and Sealed this

Fourth Day of December, 2007

JON W. DUDAS
*Director of the United States Patent and Trademark Office*